United States Patent [19]
Esaki

[11] Patent Number: 5,181,099
[45] Date of Patent: Jan. 19, 1993

[54] COMPOSITE VIDEO SIGNAL GENERATOR

[75] Inventor: Takafumi Esaki, Tokyo, Japan

[73] Assignee: NEC Corporation, Tokyo, Japan

[21] Appl. No.: 800,566

[22] Filed: Nov. 27, 1991

[30] Foreign Application Priority Data

Nov. 30, 1990 [JP] Japan ............................ 2-338554

[51] Int. Cl.$^5$ ............................................... H04N 9/00
[52] U.S. Cl. ...................................... 358/21 R; 358/22
[58] Field of Search ........................... 358/21 R, 27, 22

[56] References Cited

U.S. PATENT DOCUMENTS 4,639,765 1/1987 D'Hont ............................ 358/27 X
5,038,204 8/1991 Wan et al. ......................... 358/21 R Primary Examiner—James J. Groody
Assistant Examiner—Mark R. Powell

[57] ABSTRACT

Disclosed is a composite video generator comprising a color signal generating means, a color selecting means and an output means, and further being provided with a color change detecting means and a low amplitude color signal generating means. The composite video signal generator which combines a composite video input signal with a color signal as a character signal in accordance with a character data presence/absence signal to output the resultant signal as a composite video output signal. The composite video signal generator detects changes in the color signal and character data presence/absence signal and lowers the amplitude of the color signal at each change point, thereby suppressing the occurrence of a dot disturbance and color mixture.

3 Claims, 6 Drawing Sheets

COMPOSITE VIDEO SIGNAL GENERATOR

BACKGROUND OF THE INVENTION

1. Field of the Invention

The present invention relates to a composite video signal generator for use in an on-screen display apparatus which deals with composite video signals and displays predetermined characters on a television screen.

2. Description of the Related Art

FIG. 1 is a block diagram exemplifying a conventional composite video signal generator, and FIG. 2 is a timing chart showing its operation.

Conventionally, this type of a composite video signal generator has a modulator 1, which generates a modulated signal a with its phase modulated to that of a color subcarrier corresponding to each color, and a color signal generator 2, which alternately selects high DC voltages 17 and 18 or low DC voltages 19 and 20 that correspond to individual colors, thereby forming the waveform of each color signal f. A color selector 3 of the composite video signal generator selectively outputs a color signal e according to a red signal 13, a green signal 14 or a blue signal 15, all received as character signals. An output selector 4 consisting of a switch 23 selects the color signal e or a composite video input signal 11 in accordance with a character data presence/absence signal 12 to output a composite video output signal 16 which has character data combined therein.

This conventional composite video signal generator completely switches all the color signals from one to another in accordance with the red, green and blue signals as well as the character data presence/absence signal. The color signal is therefore switched with the maximum amplitude at the change point between color signals or at the change point between each color signal and the composite video input signal. This results incomplete separation of the composite video output signal into a luminance component and a color component in a television or the like, so that a dot disturbance or a color mixture will occur due to mixing of the luminance component into the color component.

SUMMARY OF THE INVENTION

It is therefore an object of the present invention to provide a composite video signal generator which overcomes the aforementioned shortcoming to suppress a dot disturbance and color mixture.

To achieve this object, a composite video signal generator according to the present invention, comprising a color signal generating means for generating color signals of a pulse waveform each having predetermined high and low voltages in association with an individual color; a color selecting means for selectively outputting the color signals output from the color signal generating means in accordance with an input character color signal; and an output means for combining a composite video input signal with the color signal sent from the color selecting means in accordance with an input character data presence/absence signal to output a resultant signal as a composite video output signal; further comprises a color change detecting means for detecting changes in the input character color signal and character data presence/absence signal to output a color change signal; and a low amplitude color signal generating means, provided in the color signal generating means, for generating a color signal of a pulse waveform having a lower amplitude than an amplitude determined by the high and low level voltages in accordance with the color change signal output from the color change detecting means.

According to the present invention, the color change signal is preferably a rectangular pulse signal having a predetermined time interval before and after a point of the detected change.

It is also preferable that the amplitude of the color signal generated from the low amplitude color signal generating means is about a half of the amplitude determined by the high and low level voltages.

When the color change detecting means detects changes in the color signal as a character signal to be input, and the character data presence/absence signal to output a color change signal, the color signal generating means causes the low amplitude color signal generating means to subtract a predetermined compensation voltage from a high voltage and adds it to a low voltage to generate a color signal having a low amplitude between the high voltage and the low voltage.

It is therefore easy to separate a composite video output signal into a luminance component and a color component at a change point in a television or the like, thus ensuring reduction of the occurrence of a dot disturbance and color mixture.

A problem arising with such a color change can be completely prevented if the color change signal is a rectangular pulse signal with a predetermined time interval before and after the change point.

Further, the conventional shortcoming can surely be solved by setting the amplitude of the color signal generated at the change point to about a half of the amplitude of the original color signal.

DETAILED DESCRIPTION OF THE PREFERRED EMBODIMENT

A preferred embodiment of the present invention will now be described referring to the accompanying drawings.

Figure 1:
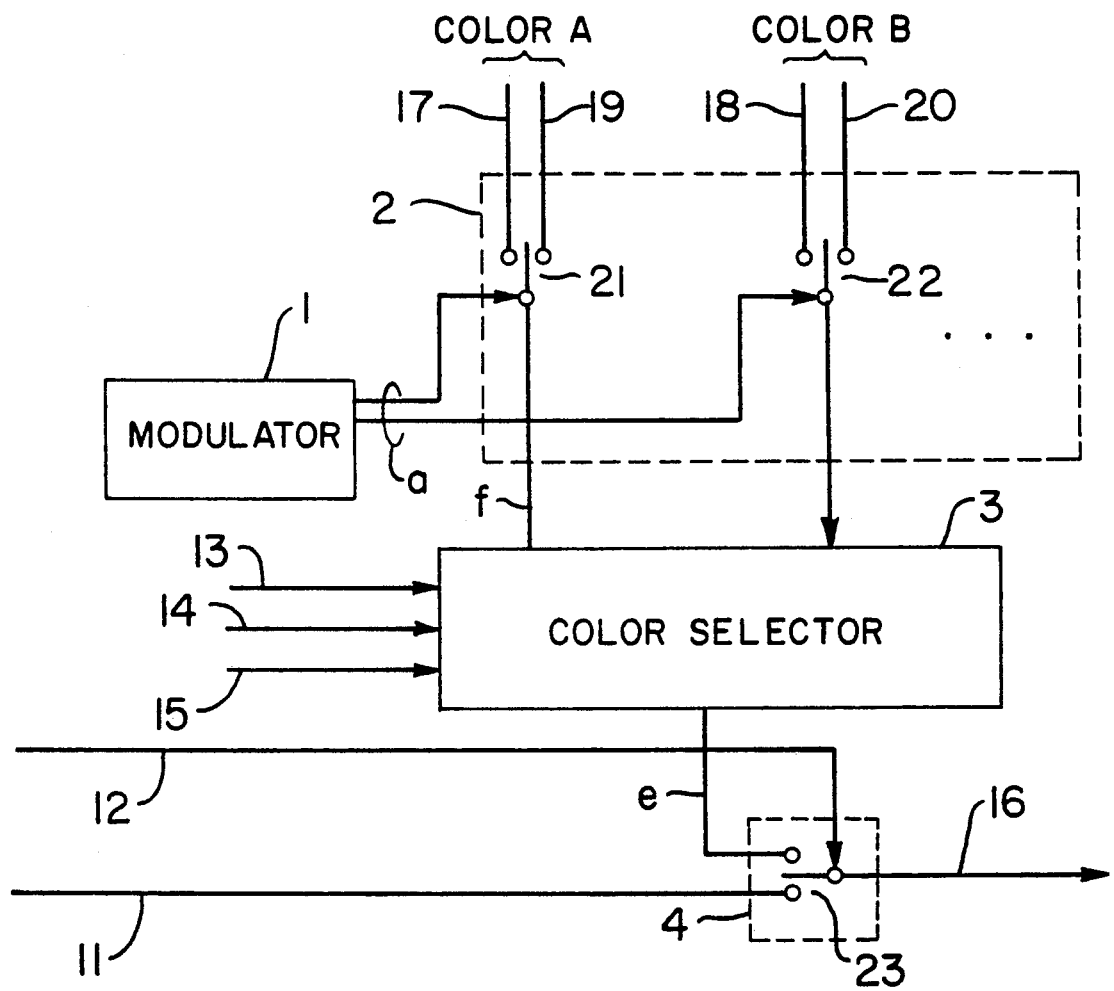
FIG. 1 is a block diagram illustrating a conventional composite video signal generator.
Figure 2:
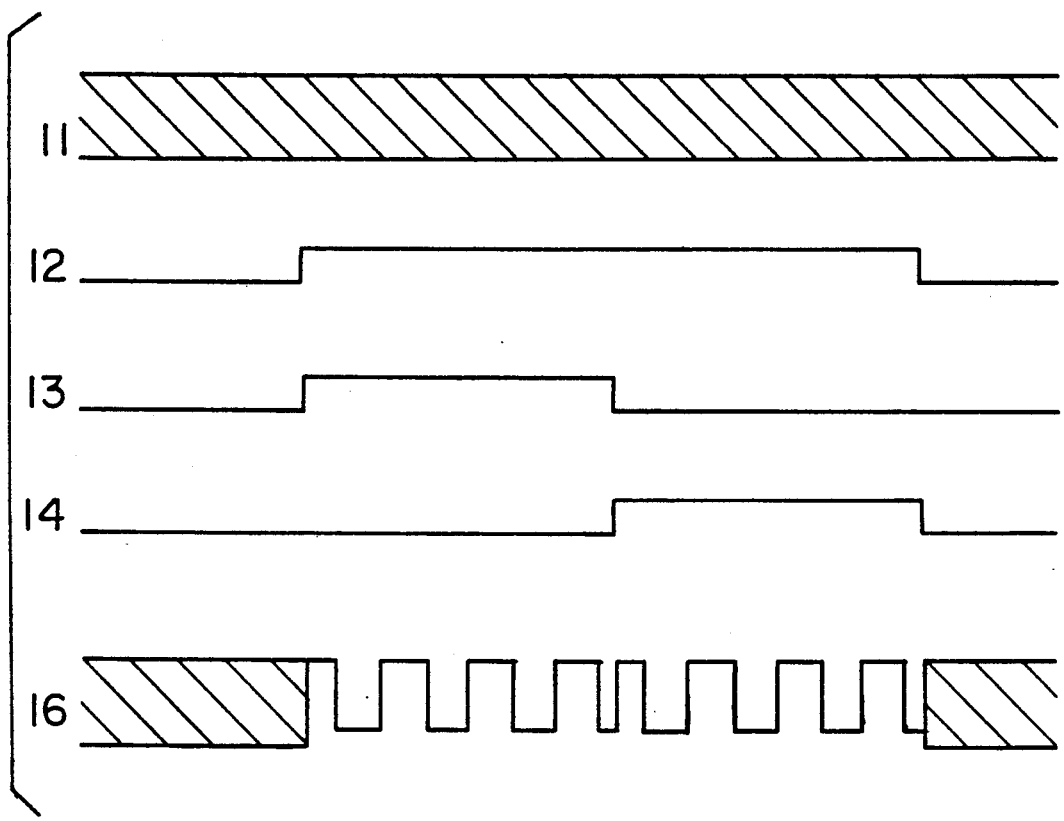
FIG. 2 is a time chart showing the operation of the conventional composite video signal generator.
Figure 3:
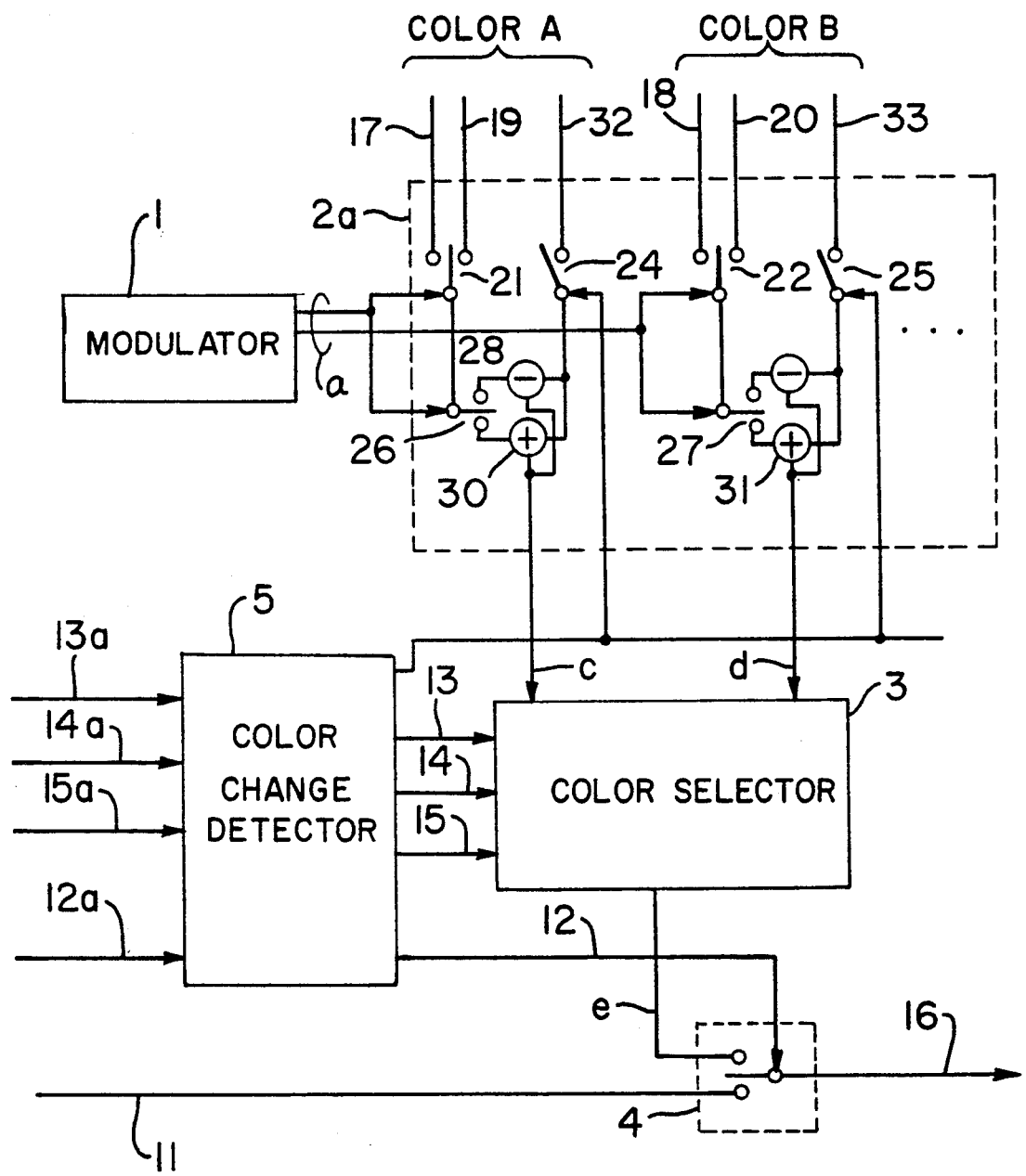
FIG. 3 is a block diagram illustrating the structure of a composite video signal generator according to one embodiment of the present invention.
Figure 4:
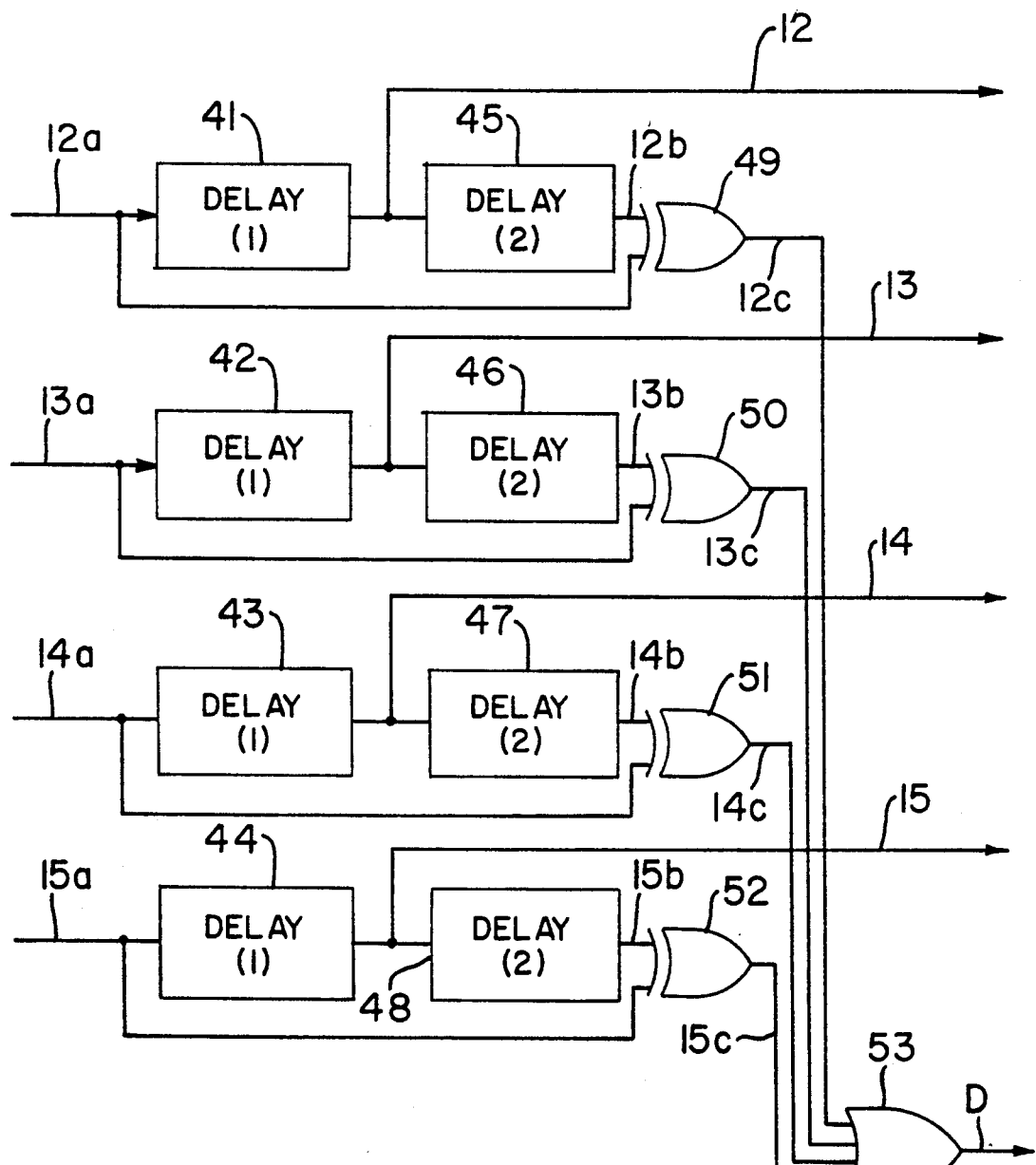
FIG. 4 is a block diagram illustrating one example of a color change detector according to the embodiment.
Figure 5A:
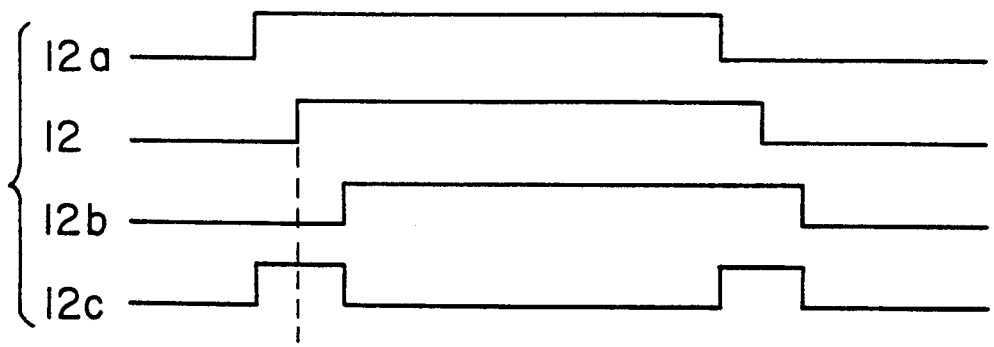
FIG. 5 A through D is a time chart showing the operation of the color change detector.
Figure 5B:
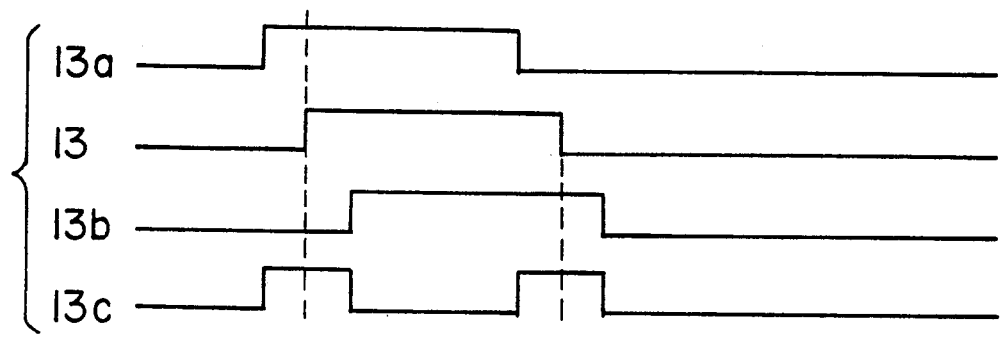
Figure 5C:
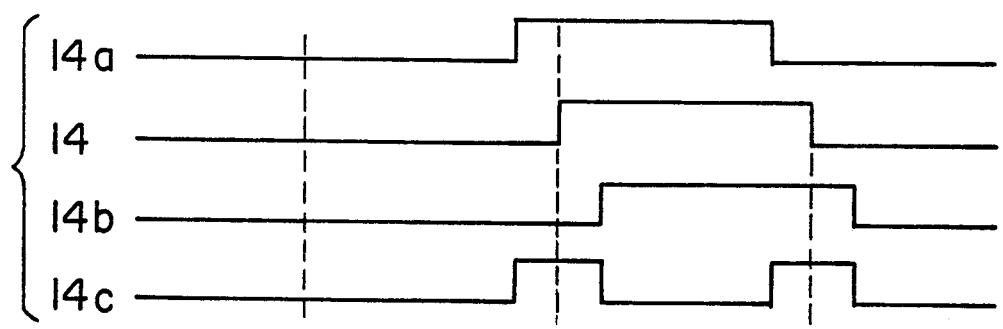
Figure 5D:
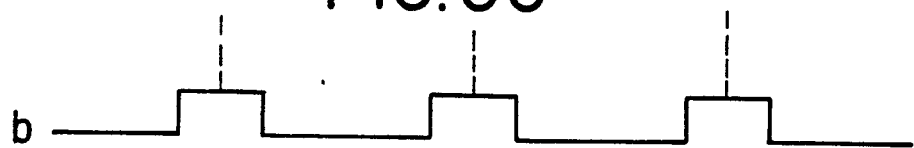

FIG. 3 is a block diagram illustrating the structure of a composite video signal generator according to one embodiment of the present invention, and FIG. 4 is a block diagram exemplifying a color change detector in the composite video signal generator.

This embodiment comprises a modulator 1, a color signal generator 2a, a color selector 3 and an output selector 4. The modulator 1 generates a color phase signal a which is modulated to have the phase of a color subcarrier corresponding to each color, and serves as a color signal generating means for generating pulse-shaped color signals c and d each having predetermined high and low voltages corresponding to each color. The color selector 3 serving as a color selecting means selects the color signal c or d sent from the color signal generator 2a and outputs it as a color signal e in accordance with a red signal 13, a green signal 14 and a blue signal 15 as character color signals to be input. In response to a character data presence/absence signal 12, the output selector 4 having a switch 23, which serves as an output means, combines a composite video input signal 11 with the color signal e received from the color selector 3 and outputs the resultant signal as a composite video output signal 16.

The embodiment further includes a color change detector 5 as a color change detecting means, which detects changes in the red signal 13, the green signal 14, the blue signal 15 and the character data presence/absence signal 12 and outputs a color change signal b. In addition to high voltages 17 and 18, low voltages 19 and 20, and switches 21 and 22, the color signal generator 2a includes compensation voltages 32 and 33, switches 24 to 27, subtractors 28 and 29, and adders 30 and 31, as a low amplitude color signal generating means which generates a pulse-shaped color signal having an amplitude lower than that determined by the high and low voltages in accordance with the color change signal b sent from the color change detector 5.

In FIG. 4, the color change detector 5 includes first delay circuits 41 to 44, second delay circuits 45 to 48, exclusive OR circuits 49 to 52 and an OR circuit 53.

A reference character data presence/absence signal 12a, a reference red signal 13a, a reference green signal 14a and a reference blue signal 15a as reference signals are sent to the respective first delay circuits 41 to 44, yielding the character data presence/absence signal 12, the red signal 13, the green signal 14 and the blue signal 15. The exclusive OR circuit 49 performs an exclusive-OR operation on the reference character data presence/absence signal 12a and an output signal 12b which is the character data presence/absence signal 12 passed through the second delay circuit 45, so as to provide an output signal 12c. Exclusive-OR operations are performed in the same manner on the red, green and blue signals 13, 14 and 15 to yield output signals 13c, 14c and 15c, respectively. Then, the OR circuit 53 performs an OR operation on the output signals 12c, 13c, 14c and 15c, providing the color change signal b.

The compensation voltages 32 and 33 are so set that the color signal generated by the low amplitude color signal generating means may have a half the amplitude determined by the high and low voltages.

The operation of this embodiment will now be described referring to time charts given in (A) to (D) in FIG. 5 and FIG. 6.

FIG. 5 shows time charts illustrating an example of the operation of the color change detector 5 in FIG. 4; wherein, (A) indicates the character data presence/absence signal 12, (B) the red signal 13, (C) the green signal 14, and (D) the color change signal b.

The reference character presence/absence signal 12a is delayed by a predetermined time in the first delay circuit 41 to be output as the character data presence/absence signal 12. The character data presence/absence signal 12 is further delayed by a predetermined time in the second delay circuit 45 to be the output signal 12b. The exclusive OR circuit 49 performs an exclusive-OR operation on the output signal 12b and the reference character data presence/absence signal 12a, yielding the output signal 12c.

The same operation is performed on the reference red signal 13a and the reference green signal 14a, yielding respectively the red signal 13 and output signal 13c, and the green signal 14 and output signal 14c.

The OR circuit 53 then performs an OR operation on the output signals 12c, 13c and 14c, providing the color change signal b as shown in (D) in FIG. 5.

The output color change signal b serves as a rectangular pulse signal which has a predetermined time interval before and after the change points of the character data presence/absence signal 12, the red signal 13 and the green signal 14.

This operation also applies true with the red signal 15.

Figure 6:
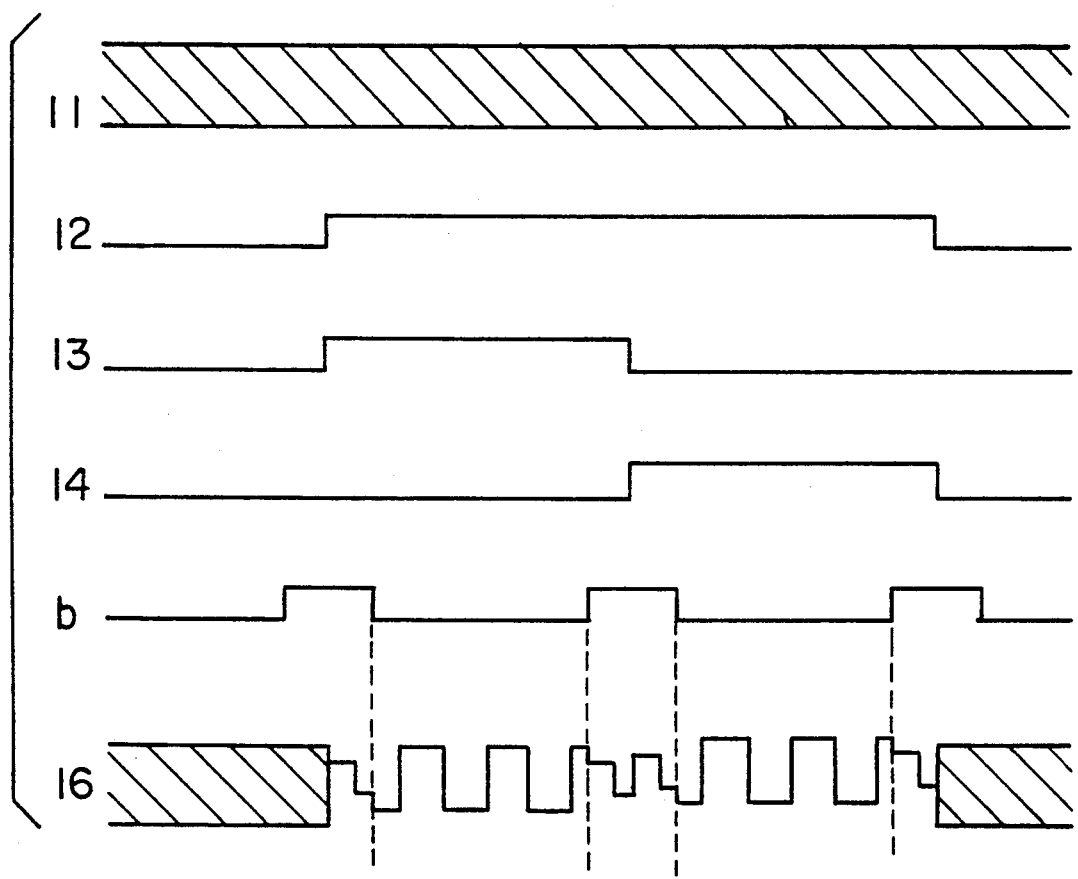
FIG. 6 is a time chart showing the operation of the embodiment of the present invention.

FIG. 6 is a time chart illustrating the general operation of this embodiment in the case where the color character signals are the red signal 13 and the green signal 14.

The modulator 1 outputs the color phase signal a which has the phase of a color subcarrier corresponding to each color. The color change detector 5 detects points where the red signal 13, the green signal 14, the blue signal 15 and the character data presence/absence signal 12 are changed, and outputs the color change signal b having a predetermined timing before and after the change points.

In accordance with the color phase signal a, the color signal generator 2a generates color signals, which have amplitudes determined only by the high voltages 17 and 18 and the low voltages 19 and 20 of the associated colors. The color signal generator 2a then combines the color signals with the compensation voltages 32 and 33 for the respective colors, individually controlled by the color change signal b.

More specifically, the subtractors 28 and 29 subtract the compensation voltages 32 and 33 from the high voltages 17 and 18, respectively, and the adders 30 and 31 add the compensation voltages 32 and 33 to the low voltages 19 and 20, respectively. The high level to low level amplitudes of the resultant composite signals c and d become a half the amplitude determined by the original high and low voltages.

The color selector 3 determines which color it is in accordance with the red signal 13, the green signal 14 and the blue signal 15, and sends the color signal e corresponding to that color to the output selector 4. The output selector 4 switches between the color signal e and the composite video input signal 11 in response to the character data presence/absence signal 12. This provides the composite video output signal 16 which has characters inserted in the composite video input signal 11, so that this signal 16 will be displayed as characters on the television screen or the like.

According to this embodiment, the amplitude of the color signal e to be switched is reduced to a half the original amplitude at points where the red signal 13, the green signal 14, the blue signal 15 and the character data presence/absence signal 12 are changed, thus inhibiting the occurrence of a dot disturbance or color mixture.

As described above, according to the present invention, since the amplitude of a color signal is reduced at a change point of each color signal or a timing where the color signal and a composite video input signal are switched from one to the other, a composite video output signal can be easily separated into a luminance component and a color component in a television or the like, thus reducing the occurrence of a dot disturbance and color mixture. This will provide a clear video image.

What is claimed is:

1. A composite video signal generator comprising:
   a color signal generating means for generating color signals of a pulse waveform each having predetermined high and low voltages in association with an individual color;
   a color selecting means for selectively outputting the color signals output from the color signal generating means in accordance with an input character color signal; and
   an output means for combining a composite video input signal with the color signal sent from the color selecting means in accordance with an input character data presence/absence signal to output a resultant signal as a composite video output signal;
   said generator further comprising
   a color change detecting means for detecting changes in the input character color signal and character data presence/absence signal to output a color change signal; and
   a low amplitude color signal generating means, provided in the color signal generating means, for generating a color signal of a pulse waveform having a lower amplitude than an amplitude determined by the high and low level voltages in accordance with the color change signal output from the color change detecting means.

2. A composite video signal generator according to claim 1, wherein the color change signal is a rectangular pulse signal having a predetermined time interval before and after a point of the detected change.

3. A composite video signal generator according to claim 1 or 2, wherein the amplitude of the color signal generated from the low amplitude color signal generating means is about a half of the amplitude determined by the high and low level voltages.

* * * * *